United States Patent [19]

Watanuki

[11] Patent Number: 5,150,253
[45] Date of Patent: Sep. 22, 1992

[54] REFLECTIVE MIRROR HAVING COOLING UNIT ATTACHED THERETO

[75] Inventor: Minoru Watanuki, Tokyo, Japan

[73] Assignee: ORC Manufacturing Co., Ltd., Tokyo, Japan

[21] Appl. No.: 699,617

[22] Filed: May 15, 1991

[30] Foreign Application Priority Data

May 18, 1990 [JP] Japan .................. 2-128649

[51] Int. Cl.$^5$ .............................................. G02B 7/18
[52] U.S. Cl. ................................. 359/360; 359/845; 126/446; 126/448
[58] Field of Search ............... 350/1.7, 609, 610, 628, 350/641, 642; 250/504 R; 359/845, 848, 883, 360; 126/442, 446, 447, 448

[56] References Cited

U.S. PATENT DOCUMENTS

| | | | |
|---|---|---|---|
| 3,686,940 | 8/1972 | Kockott | 250/504 R |
| 3,944,320 | 3/1976 | McLintic | 350/642 |
| 3,966,308 | 6/1976 | Nilson | 350/610 |
| 4,048,490 | 9/1977 | Troue | 250/504 R |
| 4,098,261 | 7/1978 | Watt | 126/447 |
| 4,488,540 | 12/1984 | McAlister | 126/448 |
| 4,532,427 | 6/1985 | Matthews et al. | 250/504 R |
| 4,798,960 | 1/1989 | Keller et al. | 350/1.7 |

Primary Examiner—Bruce Y. Arnold
Assistant Examiner—J. P. Ryan
Attorney, Agent, or Firm—Cushman, Darby & Cushman

[57] ABSTRACT

A reflective mirror having a cooling unit attached thereto is provided with a layer of material deposited on the surface of a glass plate. This material has such properties that most of ultraviolet rays in a light beam emitted from a light source are reflected from the reflective surface of the reflective mirror (cold mirror) but infrared rays permit to permeate through the reflective mirror or are absorbed in the substrate of the reflective mirror. The cooling unit is disposed on the opposite side to the reflective surface of the reflective mirror to absorptively remove infrared rays emitted from the light source. The reflective mirror is preferably employable for an exposing equipment in which the reflective mirror of the present invention and a plurality of conventional reflective mirrors each made of an ordinary metallic material are arranged as essential components with a lower working temperature.

12 Claims, 3 Drawing Sheets

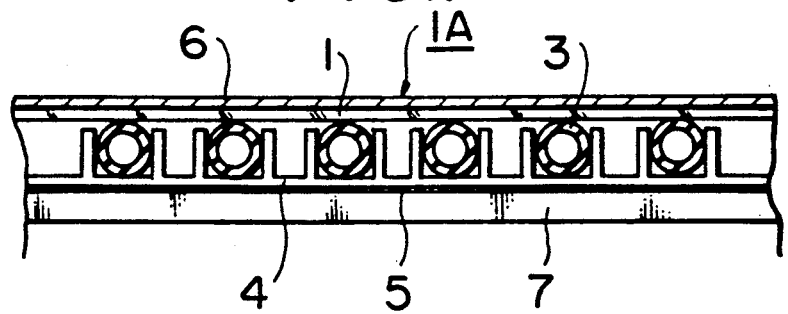
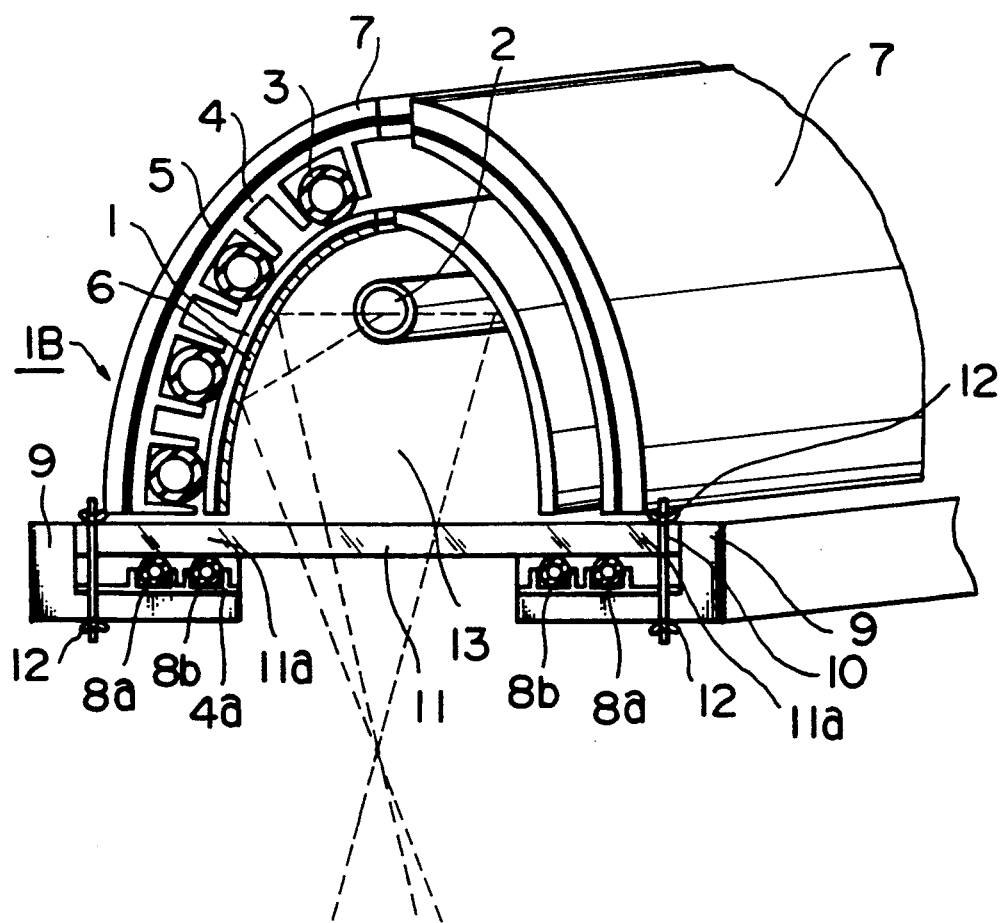

5,150,253

REFLECTIVE MIRROR HAVING COOLING UNIT ATTACHED THERETO

BACKGROUND OF THE INVENTION

1. Field of the Invention

The present invention relates generally to a reflective mirror having a cooling unit attached thereto. More particularly, the present invention relates to a reflective mirror having a cooling unit attached thereto wherein the reflective mirror is preferably employable in an exposing equipment in which a printed circuit board or the like is exposed to a light beam for the purpose of photochemical treatment.

2. Description of the Prior Art

To facilitate understanding of the present invention, a typical conventional reflective mirror having a cooling unit attached thereto will be described below with reference to FIG. 4 and FIG. 5.

FIG. 4 is a fragmentary sectional view of the conventional reflective mirror having a cooling unit attached thereto, particularly showing a left half of the reflective mirror which is arranged in an exposing equipment for photochemically treating a printed circuit board or the like. A mercury-vapor lamp 2 for emitting ultraviolet rays is arranged as a light source in the spaced relationship relative to a left half of the reflective mirror 20A. A support member 14 of a cast aluminum including a plurality of heat radiating fins 15 is fixedly placed over the rear surface of a reflective plate 17A. A cooling tube 16 of a rubber arranged in the zigzag manner is firmly held between the adjacent heat radiating fins 15 in the clamped state, and each heat radiating fin 15 is radially projected to form a heat radiating plane. A cooling medium flows through the cooling tube 16 to cool the support member 14 by absorbing heat from the reflective plate 17A. The reflective plate 17A made of an aluminum having a high purity is secured to the support member 14 such that it can readily be replaced with another one, as desired.

With the conventional reflective mirror constructed in the above-described manner, the support member 14 is made at an expensive cost and has a low ability of cooling the reflective mirror 17A, causing a temperature of the reflective plate 17A to be elevated greatly. This leads to the result that a reflective capability of the reflective mirror 20A is degraded within a comparatively short period of time and there arises a necessity for often replacing the reflective mirror 20A with another new one.

When the conventional reflective mirror constructed in the above-described manner is practically used, arrangement is made as schematically illustrated in FIG. 5. Specifically, two mirror halves 20A are coupled to each other to provide a single reflective mirror 20B which in turn is accommodated in a case 27. Since a temperature in the case 27 is elevated as the reflective mirror 20B is practically used, an air is introduced into the interior of the case 27 for the purpose of cooling via the inlet port side 18 and then discharged to the outside via an outlet port 19. With such arrangement of the cooling means as mentioned above, however, it has been found that the conventional reflective mirror has the following drawbacks.

1. Since the support member 14 of the reflective mirror 20A is made of a cast aluminum, casting molds are needed to make support members 14 on the industrial basis. However, each casting mold is fabricated at an expensive cost with many man-hours.

2. Although the reflective plate 17A is cooled to some extent with the aid of the heat radiating fins 15, it has a low cooling ability. For this reason, the reflective plate 17A is unavoidably often replaced with another new one because of oxidation caused at an elevated temperature. However, frequent replacement of the reflective plate with another new one requires many manhours, resulting in the reflective mirror 20B being practically used at an expensive cost.

3. To prevent a temperature in the exposing equipment from being elevated undesirably, a large quantity of air is introduced into the interior of the exposing equipment undesirably together with dust. Fine particles in the dust are adhesively deposited on a film during an exposing operation, causing an image on the film to be damaged or injured. As a result, a number of products are rejected as unacceptable products because of the damage or injure caused by contact with the duct in the air.

SUMMARY OF THE INVENTION

The present invention has been made in consideration of the foregoing drawbacks of the conventional reflective mirror.

An object of the present invention is to provide a reflective mirror having a cooling unit attached thereto wherein elevation of a temperature in the reflective mirror is minimized.

Another object of the present invention is to provide a reflective mirror having a cooling unit attached thereto wherein elevation of a temperature in an exposing equipment or the like in which the reflective mirror is arranged as an essential component is minimized.

To accomplish the above objects, the present invention provides a reflective mirror having a cooling unit attached thereto wherein the reflective mirror is provided with a layer of material deposited on the surface of a glass plate, the material having such properties that ultraviolet rays are reflected from the reflective surface of the reflective mirror but infrared rays permit to permeate through the reflective mirror; the cooling unit is brought in close contact with the opposite side to the reflective surface of the reflective mirror such that a cooling medium flows through the cooling unit; and a plurality of fixing members in the form of plates serve to firmly hold the cooling unit in the clamped state on the opposite side to the reflective surface of the reflective mirror.

The reflective mirror is constructed in the flat plate-shaped configuration.

Alternatively, the reflective mirror is constructed in the curved plate-shaped configuration.

The cooling unit comprises a cooling tube which is arranged in the zigzag manner on the opposite side to the reflective surface of the reflective mirror.

According to the present invention, the reflective mirror serves as a so-called cold mirror, and the cooling tube molded of a rubber or a synthetic resin serves as a cooling unit is firmly held by fixing members in the form of plates in the clamped state while it is brought in close contact with the rear surface of the reflective mirror. As a cooling medium flows through the cooling tube, the reflective mirror is effectively cooled by the cooling medium.

With such construction, the reflective mirror of the present invention assures that undesirable elevation of a temperature on the reflective mirror is prevented by absorptively removing infrared rays in the light beam emitted from a mercury-vapor lamp, and moreover a temperature in an exposing equipment having the reflective mirror of the present invention incorporated therein as an essential component can be lowered with a small quantity of air flow for the purpose of cooling. Therefore, a malfunction that dust in an air flow is adhesively deposited on a mask, a film or the like during an exposing operation can reliably be prevented with few possibility that a number of products are rejected as unacceptable products because of damage or injury of the mask or the film caused by contact with the dust in the air.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which:

FIG. 1 is a sectional view of a flat plate-shaped reflective mirror in accordance with a first embodiment of the present invention;

FIG. 2 is a partially exploded perspective view of a curved plate-shaped reflective mirror in accordance with a second embodiment of the present invention;

DESCRIPTION OF THE PREFERRED EMBODIMENTS

Figure 3:
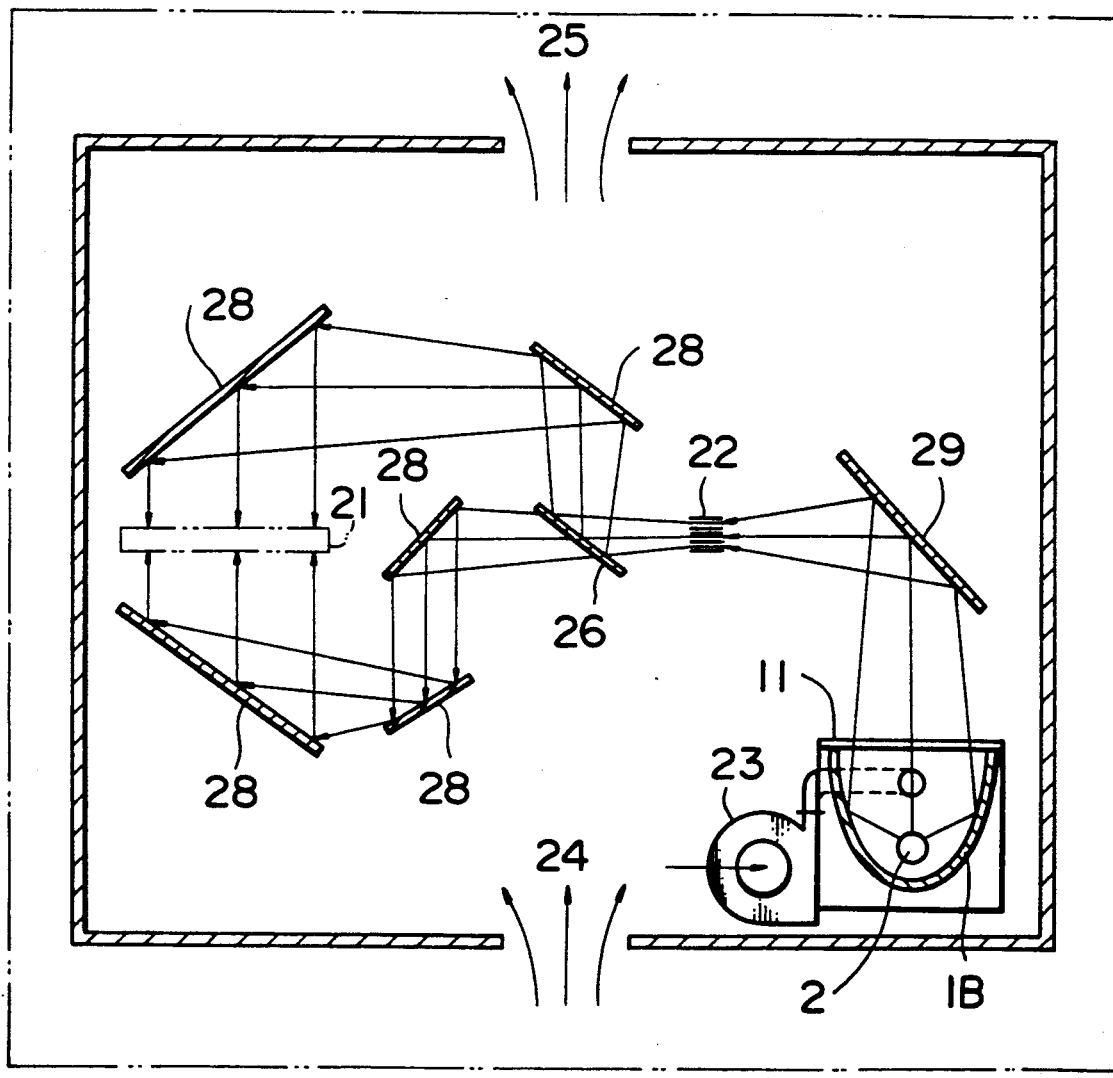
FIG. 3 is a sectional view of an exposing equipment which schematically illustrates arrangement of components wherein a curved plate-shaped and plural flat plate-shaped reflective mirrors are used as essential components for the exposing equipment.

Now, the present invention will be described in detail hereinafter with reference to the accompanying drawings which illustrate preferred embodiments of the present invention.

FIG. 1 is a sectional view of a flat plate-shaped reflective mirror having a cooling unit attached thereto in accordance with a first embodiment of the present invention and FIG. 2 is a perspective view of a curved plate-shaped reflective mirror having a cooling unit attached thereto, in accordance with a second embodiment of the present invention wherein two curved plate-shaped halves are coupled to each other at their one end to build a single arc-shaped reflective mirror.

First, the flat plate-shaped reflective mirror 1A having a cooling unit attached thereto in accordance with the first embodiment of the present invention will be described below with reference to FIG. 1. In the drawing, reference numeral 1 designates a flat glass plate. A layer-shaped plate 6 is adhesively secured to the glass plate 1 to serve as a reflective surface. Specifically, the layer-shaped plate 6 is constituted by a material having such properties that ultraviolet rays are reflected from the reflective surface of the plate 6 but infrared rays permit to permeate therethrough, so as to provide a so-called cold light mirror. The cooling unit in the form of a cooling tube 3 molded of a rubber or a synthetic resin is arranged on the rear surface of the glass plate 1 in the zigzag manner as seen from the above in the drawing. As is apparent from the drawing, each turn of the cooling tube 3 is immovably held between adjacent fixing members 4 each made of a thin metallic plate and then fixedly placed on a fixing plate 7 made of a synthetic resin or a metallic material with the aid of an adhesive 5 or the like. Since a higher intensity of light beam is received by the central part of the reflective mirror 1A rather than the opposite end parts of the same, it is recommendable from the viewpoint of effective cooling that turns of the cooling tube 3 are arranged such that a larger number of turns are allocated to the central part of the reflective mirror 1A and a smaller number of turns are allocated to the opposite end parts of the same.

Next, the curved plate-shaped reflective mirror having a cooling unit attached thereto, in accordance with the second embodiment of the present invention will be described below with reference to FIG. 2. As shown in the drawing, a mercury-vapor lamp 2 adapted to generate mainly ultraviolet rays is arranged in the region inside of the curved plate-shaped reflective mirror 1B which serves to reflect most of the ultraviolet rays in the light beam which has been emitted from the mercury-vapor lamp 2. According to the second embodiment of the present invention, a glass plate 1 and a reflective surface 6 are designed to have a curved surface suitable for reflection of the light beam. To assure that a cooling tube 3 is brought in close contact with the rear surface of the glass plate 1, the cooling tube 4 is immovably held between the adjacent fixing plates 4 with the aid of a back-up plate 7 while extending through a series of inverted U-shaped spaces defined by the fixing plates 4 in the zigzag manner as seen from the above in the drawing. As is apparent from FIG. 2, the reflective mirror 1 is constituted by two curved halves which are coupled to each other at the central part thereof by using suitable means so as to build a single substantially arc-shaped reflective mirror 1B. A glass plate 11 is fixedly secured to an opening portion of the reflect mirror 1B. In addition, cooling tubes 8a and 8b are immovably arranged below the opposite end parts of the glass plate 11 with the aid of fixing members 9 which are firmly placed on the cooling tubes 8a and 8b by tightening bolts 10 and wing nuts 12 so as to forcibly bring the cooling tubes 8a and 8b in contact with the glass plate 11.

FIG. 3 is a sectional view which schematically illustrates the structure of a conventional exposing equipment for which the reflective mirror of the present invention is employed. An example of practical usage of the reflective mirror of the present invention will be described below with reference to FIG. 3. In the drawing, reference numeral 1B designates a reflective mirror of which structure is same to that shown in FIG. 2. Although no description has been made above with reference to FIG. 2, the opposite ends of the reflective mirror 1B are closed with a plate-shaped member, respectively. The opposite ends of a mercury-vapor lamp 2, an air inlet through which an air flow generated by a blower 23 is introduced into the hollow space of the reflective mirror 1B and a discharge port through which the air flow is discharged to the outside from the reflective mirror 1B are arranged on the plate-shaped members.

A light beam emitted from the mercury-vapor lamp 2 reaches the inside surface of the reflective mirror 1B along which the light beam is reflected. Reflection of the light beam is accomplished such that most of ultraviolet rays are reflected from the reflective surface of the reflective mirror 1B to reach subsequent reflective mirrors 28 but most of infrared rays permit to permeate through the reflective mirror 1B to reach the cooling tubes 3 arranged on the rear surface of the reflective mirror 1B so as to allow the permeated infrared rays to be absorbed as heat in a cooling medium which flows through the tubes 3. In spite of this fact, however, only a small amount of infrared rays is reflected from the reflective mirror 1B to reach the reflective mirror 29. For this reason, an ordinary reflective plate may be employed for the reflective mirror 29. The light beam which has been reflected from the reflective mirror 29 (most of the reflected light beam being composed of ultraviolet rays) permeates through a fly-eye lens 22 to reach a half mirror 26 at which the light beam is divided into two pars. Each of the divided light beam is successively reflected at a plurality of subsequent reflective plates 28 to reach a printed circuit board 21 or the like which should photochemically be processed by exposure to the light beam. With respect to the exposing equipment as constructed in the above-described manner while including the reflective mirror of the present invention, an ordinary reflective plate may be employed for the reflective mirror 29 and the subsequent reflective plates 28.

Figure 4:
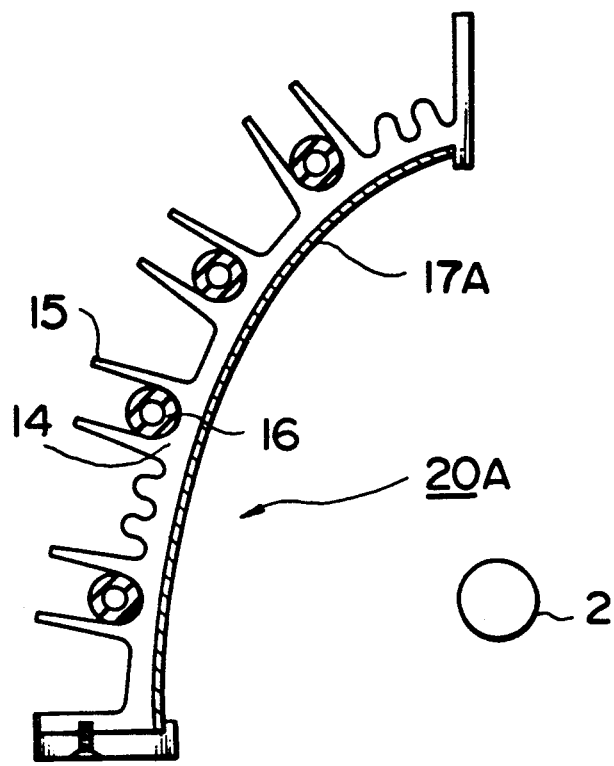
FIG. 4 is a fragmentary sectional view of a conventional curved plate-shaped reflective mirror, particularly showing a left half of the reflective mirror.
Figure 5:
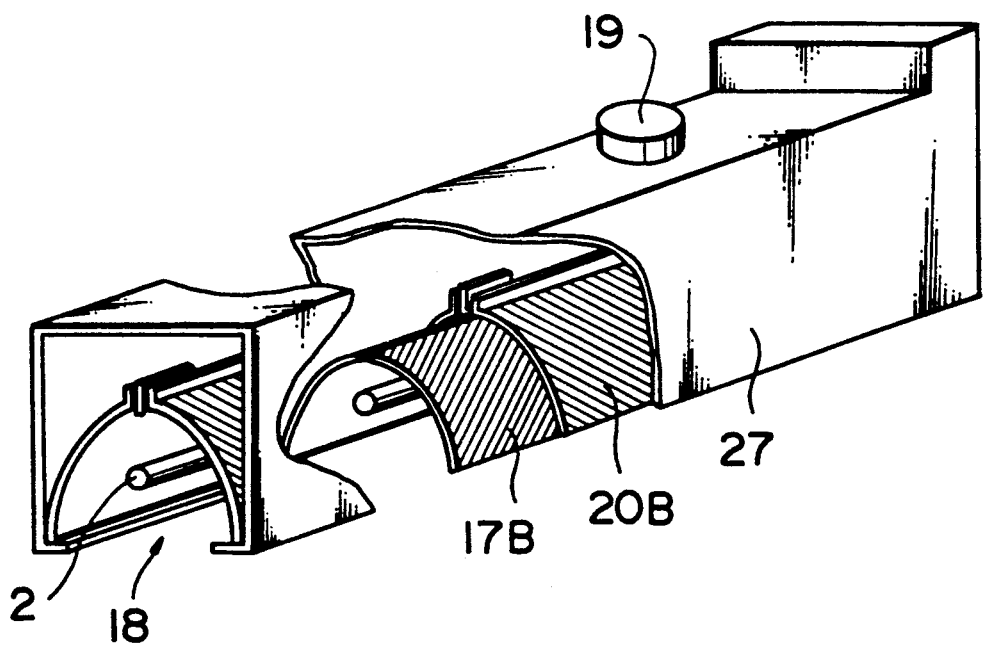
FIG. 5 is a partially exploded perspective view of the conventional curved plate-shaped reflective mirror composed of two halves shown in FIG. 4.

On the other hand, a exposing equipment of which structure is substantially same to that shown in FIG. 3 includes a conventional curved plate-shaped reflective mirror 20A as shown in FIG. 4, and the reflective mirror 20A is constructed as illustrated in FIG. 5. With the reflective mirror 20A, since not only ultraviolet rays but also infrared rays in the light beam emitted from a light source are reflected from the reflective mirror 20A, only a small amount of the light beam is absorbed in a support member 14 of the reflective mirror 20A with the result that an inner mirror plate 17B is heated to an elevated temperature. For this reason, the reflective mirror 28 and the subsequent reflective plates 28 are heated to an elevated temperature. To minimize elevation of the temperature on the reflective mirror 20A, the reflective mirror 29 and the subsequent reflective plates 28, a plurality of radially extending fins 15 are arranged over the outer surface of the reflective mirror 20A or 20B. In addition, to lower the temperature in the exposing equipment, a large quantity of air is introduced into the interior of the exposing equipment via an inlet port 24 and then discharged to the outside via an outlet port 25. With this construction, a number of products are rejected as unacceptable products due to the presence of dust in the air. In contrast with the case where the conventional reflective mirror is employed for the exposing equipment, according to the present invention, the temperature not only on the reflective mirror but also in the exposing equipment can be lowered substantially. This leads to advantageous effects that a small quantity of air is required to flow through the exposing equipment and the number of unacceptable products rejected due to dust in the air can be reduced substantially.

While the present invention has been described above with respect to two preferred embodiments, it should of course be understood that the present invention should not be limited only to them but various changes or modifications may be made without departure from the scope of the invention as defined by the appended claims.

What is claimed is:

1. A reflective mirror comprising:
   a reflective layer of material deposited on the surface of a first plate, said material having properties that ultraviolet rays are reflected from said reflective surface and infrared rays are passed through said reflective surface; and
   a cooling unit comprising:
      a first cooling pipe contacting a surface of said reflective mirror opposite to the reflective surface of said reflective mirror; and
      a plurality of first fixing members in the form of plates contacting and holding said first cooling pipe to said opposite surface of said reflective surface of said reflective mirror.

2. A reflective mirror as claimed in claim 1, wherein said reflective mirror is constructed in a flat plate-shaped configuration.

3. A reflective mirror as claimed in claim 1, wherein said reflective mirror is constructed in a curved plate-shaped configuration.

4. A reflective mirror as claimed in claim 3, wherein said reflective mirror is composed of a pair of curved plate-shaped mirror halves which are coupled to each other to exhibit an arc shaped configuration, and an opening portion in which the reflected light beam is passed through and between the ends opposite to said coupled ends of the reflective mirror and is closed with a glass plate.

5. A reflective mirror as claimed in claim 4, wherein said opposite ends of the reflective mirror are closed with a plate so that air may be introduced into the hollow space defined by the reflective mirror and said plate.

6. The reflective mirror as claimed in claim 4, further comprising:
   a second cooling pipe contacting a surface of said glass plate exterior to the hollow space defined by the reflective mirror and said plate; and
   a plurality of second fixing members in the form of plates contacting and holding said second cooling pipe to said glass plate.

7. The reflective mirror as claimed in claim 6, wherein said second cooling pipe is arranged in a zigzag configuration against said opposite surface.

8. The reflective mirror as claimed in claim 6, wherein said second fixing members are connected to a second back-up plate.

9. The reflective mirror as claimed in claim 8, wherein said second fixing members are substantially perpendicular to said second back-up plate.

10. The reflective mirror as claimed in claim 1, wherein said first cooling pipe is arranged in a zigzag configuration against said opposite surface.

11. The reflective mirror as claimed in claim 1, wherein said first fixing members are connected to a first back-up plate.

12. The reflective mirror as claimed in claim 11, wherein said first fixing members are substantially perpendicular to said first back-up plate.

* * * * *